Oct. 20, 1970 E. H. HILBORN 3,535,446

METHOD AND MEANS FOR AN IMPROVED ELECTRON BEAM SCANNING SYSTEM

Filed April 10, 1968 3 Sheets-Sheet 1

EDWIN H. HILBORN
INVENTOR.

BY [signature]
[signature]
ATTORNEYS.

EDWIN H. HILBORN
INVENTOR.

BY

ATTORNEYS.

Oct. 20, 1970 E. H. HILBORN 3,535,446

METHOD AND MEANS FOR AN IMPROVED ELECTRON BEAM SCANNING SYSTEM

Filed April 10, 1968 3 Sheets-Sheet 3

EDWIN H. HILBORN
INVENTOR.

BY [signature]
[signature]
ATTORNEYS.

United States Patent Office 3,535,446
Patented Oct. 20, 1970

1 2

3,535,446
METHOD AND MEANS FOR AN IMPROVED ELECTRON BEAM SCANNING SYSTEM

Edwin H. Hilborn, Framingham, Mass., assignor to the United States of America as represented by the Administrator of the National Aeronautics and Space Administration Filed Apr. 10, 1968, Ser. No. 720,125
Int. Cl. H01j *29/70;* H04n *3/16*
U.S. Cl. 178—7.7 8 Claims

ABSTRACT OF THE DISCLOSURE

An electron beam scanning system is provided wherein each frame is composed of two interlaced fields, but successive frames utilize new phase relationships between the horizontal and vertical oscillators so as to displace the raster vertically by a fraction of the height of a raster line at both camera and monitor. This serves to transmit different imagery on successive frames, and advantage is taken of the temporal integration characteristics of the visual system of the observer to combine these different images so as to obtain greater apparent vertical resolution than is present in any individual frame.

ORIGIN OF THE INVENTION

The invention described herein was made by an employee of the U.S. Government and may be manufactured and used by or for the Government of the United States of America for governmental purposes without the payment of any royalties thereon or therefor.

BACKGROUND OF THE INVENTION

This invention relates in general to electron beam scanning, and more particularly, to a method and means for scanning useful in raster scanning systems such as television systems and character recognition systems.

Many techniques for increasing picture sharpness for a given bandwidth have been described in the prior art. These improvements are desirable and have great commerical value because video communication bandwidth limitations must necessarily be imposed. For example, the available channel widths for commercial television have been limited in order to permit a reasonable number of competitive programs within the total amount of the electromagnetic spectrum available. Transmission bandwidth in turn determines the total number of picture elements which can be transmitted per unit time. Getting the most information out of these elements thus becomes a matter of utilizing these elements most advantageously.

As is well known, the present commercial television system standardized in the United States has 525 horizontal lines scanned 30 times (frames or complete pictures, comprising 2 interlacted fields per frame) a second with the video bandwidth limited to 4.25 megahertz. This method of scanning (known as vertical interlace) provides the dual virtues of reducing the flicker which would be objectionable if a frame rate of 30 Hertz were used without interlace and of reducing the differential vertical picture brightness which would be present without interlace. Because of the persistence of the human visual system, it appears that the scan of 525 lines is presented instantaneously.

Since the establishment of these standards, a number of techniques have been developed for bandwidth reduction for special purposes. For example, U.S. Pat. No. 2,479,880 issued to P. M. G. Toulon on Aug. 23, 1949 describes a discontinuous interlace scanning system as a suggested substitute for the standard interlace system; however, the system as described fails to take into account the finite rise and decay time of both the electron beam and the phosphor response. Higher order interlace techniques have been attempted; however higher order interlace, in general, produces the undesirable phenomenon of line crawling. Attempts to rectify this, as by the means described in U.S. Pat. 2,472,774 issued to L. F. Mayle on June 7, 1949 result in a system completely incompatible with present standards without extensive modification of all home receivers. Still another technique is described in U.S. Pat. No. 3,309,461 issued to S. Deutsch on Mar. 14, 1967, which technique discloses a narrow band TV transmission system wherein successive fields are deflected in a pseudo-random manner to eliminate flicker as slow scanning is performed. This system has concentrated on obtaining a major reduction in bandwidth while maintaining some graceful degradation of picture quality, and again has no compatibility with existing broadcast standards. A system which uses both vertical and horizontal interlace is described in U.S. Pat. No. 2,921,211 issued to P. M. G. Toulon et al. on Jan. 12, 1960. However, the system described therein is not compatible with commercial signals nor can it be used without modification of the monitor or with a single gun monitor or with a monitor which uses only a single phosphor.

OBJECTS AND SUMMARY OF THE INVENTION

An object of this invention is to provide an improved method and apparatus for electron beam scanning to present a high definition image to an observer within the conventional television bandwidth.

Another object of ths invention is to provide an improved method and apparatus for electron beam scanning to reduce the video bandwidth required for a suitable high definition image and thereby reduce the power requirements for video signal transmission.

Still another object of this invention is to provide apparatus for modifying a scanning raster whereby said apparatus is substantially simplified relative to that indicated as required by the teachings of the prior art.

These and other objects of the invention are accomplished by displacing the raster by a fraction of the height of a raster line on each successive frame. Instead of using the zero degree phase relationship conventionally maintained between the horizontal and vertical oscillators, the present invention comprehends the utilization of changing to a new phase relationship at the start of each frame, maintaining this precise relationship throughout both fields of that frame, and changing to a new phase relationship at the start of the next frame. The phase relationships are maintained at both the camera and monitor in order to maintain the correct positional relationships of imagery. Implementation of this raster displacement principle can be accomplished in a number of ways to be hereinafter described.

To illustrate the improvement which results from this, an analogy from motion picture technology may be used. For example, a single frame of motion picture film when viewed under a magnifier has surprisingly poor resolution when compared with the apparent quality of the pictures projected at normal frame rates on a large theater screen. At least part of this apparent difference results from the random grain structure in the film emulsion, such that the observer uses the different information on different frames to piece together the most probable picture content. Similarly, by considering the TV raster as a "grain," the instant technique serves to displace the raster by a fraction of the height of a raster line on each successive frame, so that the eye can perform a temporal integration of the different information in the different raster "grains."

BRIEF DESCRIPTION OF THE DRAWINGS

The novel features that are considered characteristic of this invention are set forth with particularity in the appended claims. The invention, both as to its organization and method of operation, as well as additional objectives and advantages thereof, will best be understood from the following description when read in connection with the accompanying drawings, in which:

DETAILED DESCRIPTION OF THE DRAWINGS

Figure 1:
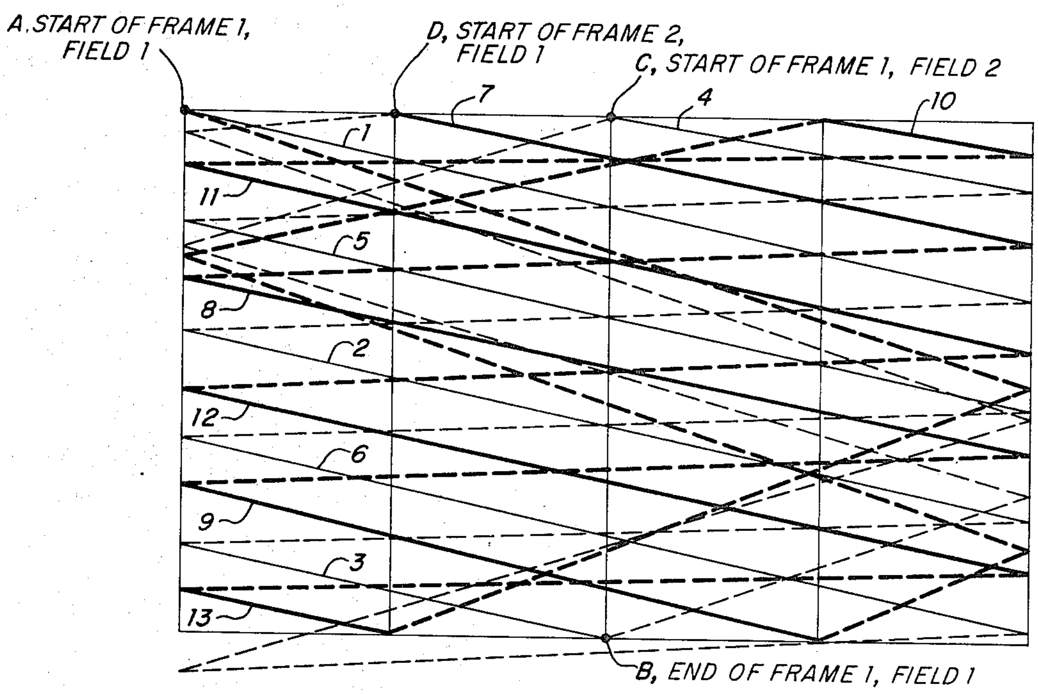
FIG. 1 is a schematic plan view of the modified scan produced by the embodiments shown in FIGS. 2–4 wherein each frame is presented at 30 frames per second and composed of two interlaced fields, but the phase relationship between horizontal and vertical oscillators is shifted 90° for each successive frame.
Figure 2:
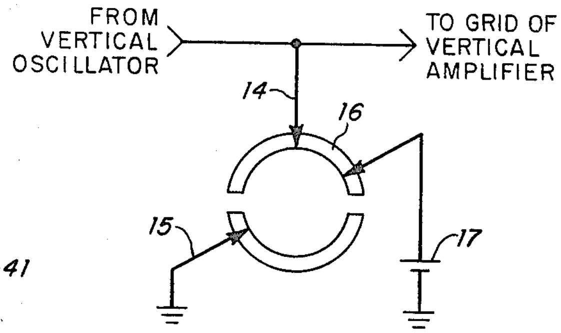
FIG. 2 illustrates in schematic form a portion of a vertical amplifier circuit in a TV system wherein bias voltages are sequentially introduced into the grid-leak ground to produce the desired phase shift.
Figure 3:
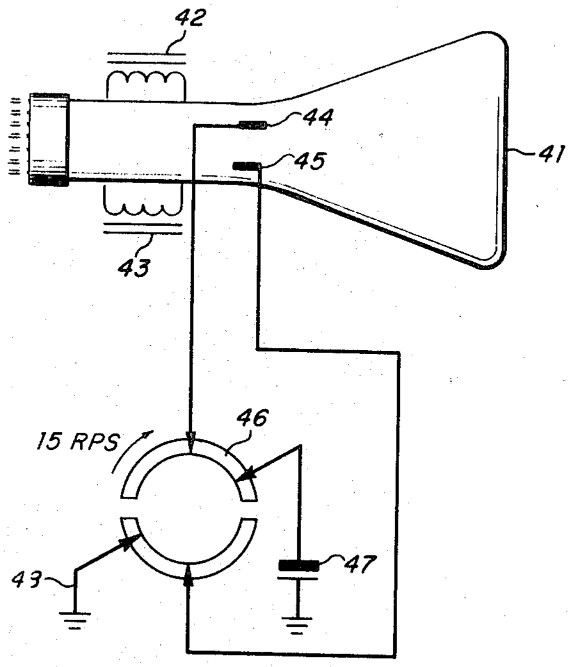
FIG. 3 is a schematic diagram depicting another embodiment of the invention wherein a tube having both electrostatic and electromagnetic focus (such as those employed in computerized alphanumeric displays) has bias voltages sequentially introduced into the electrostatic portion to produce the desired phase shift.
Figure 4:
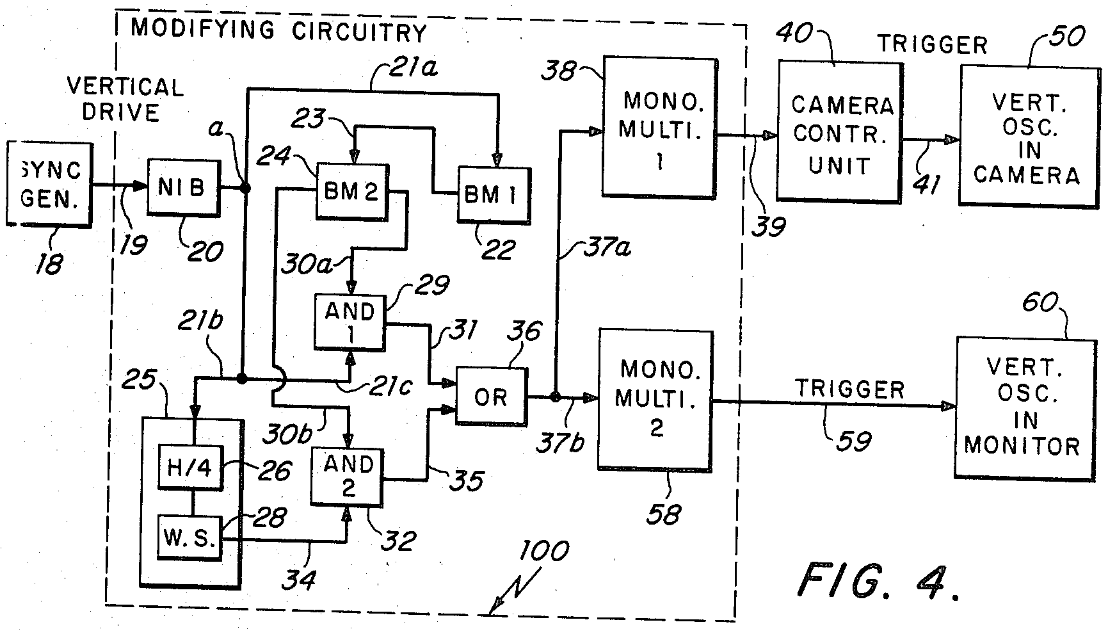
FIG. 4 is a block diagram showing modifying circuitry connected between the synchronous generator and the camera and the monitor for a preferred embodiment of the invention in a closed circuit television system.

In order to properly understand the present invention, it is desirable to first consider FIG. 1 which is a schematic plan view of a few lines of the modified raster scan produced by each of the embodiments shown in FIGS. 2–4. The raster scan shown in FIG. 1 depicts the instant modified scan wherein each frame is presented at 30 frames per second, with two interlaced fields per frame, but the phase relationship between horizontal and vertical oscillators is shifted 90° for each successive frame. In FIG. 1, the scanning beam starts at point A and successively scans lines 1, 2, and 3 as the first field of frame one. The scan of the last line 3 is only half of the width of the raster as indicated by point B on FIG. 1. Vertical retrace then occurs, and the beam then scans lines 4, 5, and 6 sequentially as the second field of the first frame. Since line 4 occupies only half of the width of the raster, starting at point C in FIG. 1, a total of five lines are scanned during the two fields, as is typical of an odd-line, interlaced field system. Under normal scanning procedure, the beam would return to point A, and retrace the same path. However, under the teachings of the instant invention, a phase shift of 90° is introduced during vertical retrace, so that the next frame starts at point D, and traces out lines 7, 8, and 9 as the first field of the second frame and traces lines 10, 11, 12, and 13 as the second field of the second frame. The phase shift is now removed during vertical retrace, so that the next frame starts at point A again.

FIG. 2 illustrates in schematic form a portion of a typical vertical amplifier found in TV systems wherein bias voltages are sequentially introduced into the grid-leak ground of the amplifier to produce the desired phase shift. Normally, the grid-leak connection via a lead 14 is continuously connected to an electrical ground. However, in the present invention, a commutator switch 16 is interposed into the grid-leak connection. A bias voltage from a source 17 is applied to one side of the switch 16. An electrical ground via a lead 15 is connected to the other side of the switch 16. The commutator switch 16 is driven synchronously at 15 revolutions per second in order that sufficient voltage is added every other frame to raise or lower the raster by a fraction of the height of a scanning line. Namely, the amount of bias is changed every frame and kept fixed for both fields of that frame.

FIG. 3 is a schematic diagram of means for accomplishing the desired phase shifts between oscillators in computerized alphanumeric displays utilizing a cathode ray tube having both electromagnetic and electrostatic deflection. In FIG. 3, a pair of magnetic coils 42 and 43 of a cathode ray tube 41 are energized in the normal manner from a vertical oscillator (not shown). To produce the desired phase shift, bias voltages are sequentially introduced into the electrostatic portion 44 and 45 of the tube 41. The vertical deflection plates 44 and 45 are connected to opposite halves of a conventional commutator switch 46 which is driven synchronously at 15 revolutions per second. A bias source 47 and a ground via lead 48 are connected to opposite halves of the switch 46. A sufficient voltage from the source 47 is added every other frame to raise or lower the raster by a fraction of the height of a scanning line. The amount of this deflection is changed every frame and kept fixed for both fields of that frame. The raster changes take place in both the camera and the receiver in a synchronized manner.

FIG. 4 depicts a block diagram of another means for obtaining the desired phase shift, showing the modifying raster scanning circuitry 100 in a closed circuit television embodiment, which circuitry 100 is interposed between a synchronizing generator 18, a camera 50 and a monitor 60. The synchronous generator 18, the camera 50, the camera control unit 40 and the monitor 60 are conventional units and may be of the type such as Dage Model 431, Dage Model 91, Dage Model 420 and Miratel LV14M, respectively.

Figure 5:
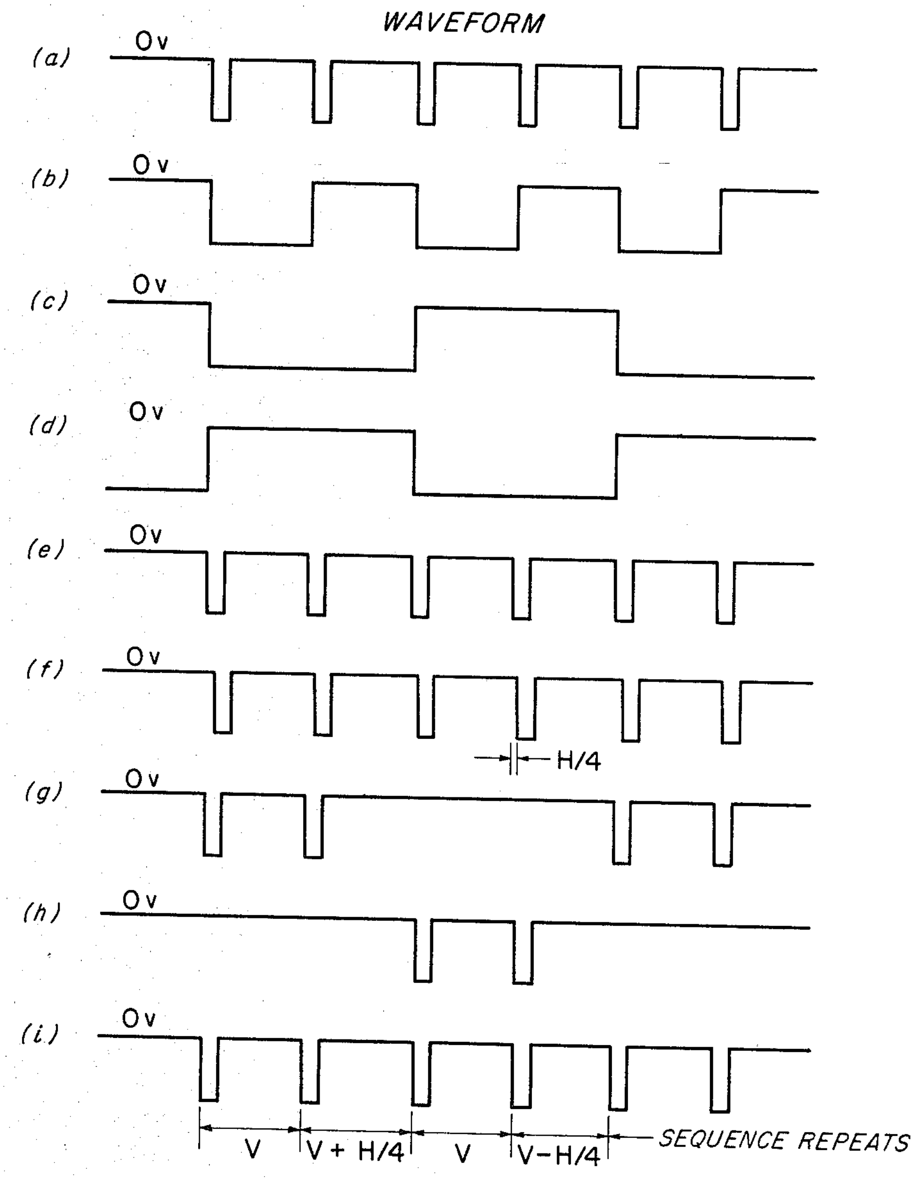
FIG. 5 is a waveform diagram corresponding to the different waveform outputs shown in identified locations in FIG. 4.

A vertical drive pulse train (VDPT), FIG. 5(*a*), from the synchronizing generator 18 is fed via a lead 19 to a non-inverting buffer 20. The non-inverting buffer 20 acts as an isolation unit separating the synchronous generator 18 from the modifying circuitry 100, thereby maintaining the integrity of the square wave pulse train output from the buffer 20 shown in FIG. 5(*a*). However, it is to be noted that the non-inverting buffer 20 can be eliminated in applications which do not require separation of the load from the synchronous generator. The output from the non-inverting buffer 29 then follows three separate electrical paths via leads **21*a*, 21*b* and 21*c*. A first path via the lead 21*a* goes through a bistable multivibrator 22** which operates to produce the output waveform shown in FIG. 5(*b*). The output of bistable multivibrator 22 is fed via lead 23 to a second bistable multivibrator 24 to produce in a well-known manner the complementary wave trains shown in FIG. 5(*c*) and in FIG. 5(*d*), which wave trains are synchronized with each other but now with only one-fourth the frequency of the original vertical drive pulse train, FIG. 5(*a*). A second path via lead **21*b* is fed to a delay unit 25 which comprises a pair of monostable mutlivibrators, 26 and 27, connected in series. The first monostable multivibrator 26** causes the pulse train to be delayed by the desired interframe shift (in this case H/4 seconds), FIG. 5(*f*) with respect to the original VDPT, FIG. 5(*a*). As is well-known, H is the duration of one scanning line, which, in a 525-line system, is 63.492 μsec. V is the duration of one field which, in a 30 frame/second system, is 16.667 msec. The second monostable multivibrator 28 shapes the delayed pulse train without adding any further delay. A third path via lead **21*c* is fed into an AND gate 29** along with bistable multivibrator output, FIG. 5(*c*), via a lead **30*a*. The output of the AND gate 29 via a lead 31** is a pulse train which, as shown in FIG. 5(*g*), is in phase with the original VDPT but with every other pulse pair absent.

The inputs into an AND gate 32 via a pair of leads 33 and **30*b*** are the delayed pulse train, FIG. 5(*f*), and the complement of the output, FIG. 5(*d*) of the bistable multivibrator 24. The output of the AND gate 32 via a lead 34 is a pulse train, FIG. 5(*h*), that is delayed with respect to the original VDPT, but with every complementary pulse pair missing with respect to pulse train, FIG. 5(*g*). The outputs of AND gate 29 and AND gate 32 via leads 31 and 35, respectively, enter OR gate 36. The output of OR gate 36 is a pulse train, FIG. 5(*i*), with the desired timing relationships between the pulses. The leading edge of each pair of pulses is V seconds apart, while the interpulse pair distance alternates (in this case) in a $$\left(V+\frac{H}{4}\right) \text{sec.}, \left(V-\frac{H}{4}\right) \text{sec.}$$

fashion, as shown in the final timing sequence, FIG. 5(*i*). The pulse train, FIG. 5(*i*), follows two paths via leads **37*a* and 37*b*. The first path is fed via lead 37*a* to a monostable vibrator 38 for final shaping and then via a lead 39 to the camera control unit 40, the output of which via lead 41 triggers the vertical oscillator in the camera 50. The second path is fed via lead 37*b* to a monostable vibrator 58 for final shaping (in this case from a negative pulse to a positive pulse) and is then fed via lead 59 into the monitor 60** to trigger its vertical oscillator in synchronism with the camera vertical oscillator. The modified raster now has the desired intraframe and interframe timing.

The system described above, with obvious modifications, becomes amenable to commercial television signal transmission with no requirement for modification of home TV receivers. In order to synchronize the receiver with the camera in the transmission television system, the camera raster is driven into the desired (frame shift) configuration by the appropriate synchronizing circuitry at the transmitter. Then the equalizing and serration pulses of the transmission signal are modified at the transmitter by appropriate circuitry, to produce the corresponding interframe shift of H/4 in the receiver. This is accomplished by changing the standard transmission pulse train to the desired modified form by appropriate combinations of AND and OR gates and delay circuitry, as is obvious from the technique depicted in FIG. 4. Still another approach in applying the instant method of raster scanning to commerical television with no requirement for the modification of home TV receivers is to gradually change the phase between horizontal and vertical oscillators during the lines (about 25) normally lost during vertical retrace. In this case, rather than to produce an H/4 delay instantaneously, each of the horizontal sync signals during vertical retrace is delayed by an incremental 25 H/4 amount. By thus modifying the synchronizing signals at the transmitter, the home receiver can follow the phase changes because of the relatively free running horizontal oscillator in the receiver.

There has accordingly been described and shown herein a novel, useful and improved method and apparatus for transmitting and receiving video communication signals wherein the resolution of the picture received for a given channel bandwidth is increased, and wherein the bandwidth required for a given picture quality is considerably reduced.

A feature of the invention is that apparatus for improving the sharpness of a picture can be readily provided with a minimum amount of circuitry.

An important feature of the invention is that the instant scanning system provides the equivalent of adding a hundred or more lines to a standard 525-line system without increasing the system bandwidth. The maximum improvement that can be made with the present system is the equivalent of adding 525 lines to the standard 525-line system without increasing the bandwidth.

Another feature of the present invention is that in other applications, such as in space vehicles where picture quality is acceptable at a predetermined standard, the present technique enables a reduction of bandwith and hence a reduction of the transmission power required.

Figure 6:
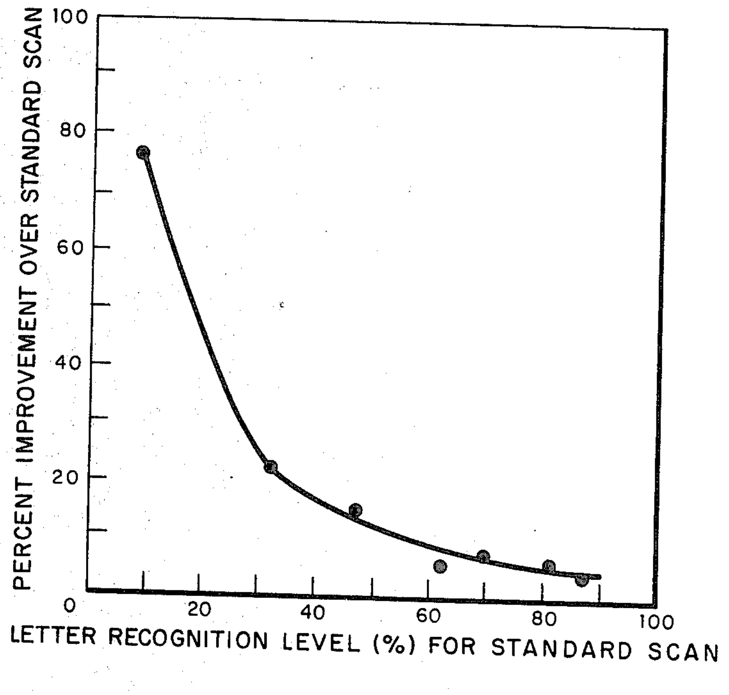
FIG. 6 is a graph showing the improvement in recognition level for alphanumeric characters for the novel raster scan described herein over the standard scan.

As a verification of the ability of an observer to resolve different characters when the present scanning technique was employed, the results shown in FIG. 6 were obtained. The test consisted of analyzing the ability of subjects to identify small capital letters presented on a monitor. For this purpose, a series of cards, each containing 100 random capital letters was prepared using a Leroy lettering guide. The cards were photographically enlarged and reduced to yield the desired increments in character size, placed 45" in front of a camera and evenly illuminated at 400 foot-candles. The subjects identified the characters on the monitor. Ambient illumination at the monitor was maintained at 1.7 foot-candles and the tube brightness and contrast adjusted to yield a highlight brightness of 4 foot-lamberts and a character brightness of 0.75 foot-lamberts. The test was limited to a comparison of the standard scan and the H/4 scan previously described. All subjects started with the largest character size and viewed progressively smaller characters on each trial. Each subject was tested with a total of 7 different character sizes on each of the scan patterns.

The mean improvement in recognition accuracy for the instant scan over the standard scan, as depicted in FIG. 6, is as great as 75 percent when the data are corrected for chance effects.

The specific embodiment herein described is intended to be merely illustrative and not restrictive of the invention. Various modifications in changes and form and detail will be obvious to those skilled in the art. Implementation of the instant raster displacement principle can be accomplished in a number of ways. For example, in certain applications the monostable multivibrators 38 and 58 shown in FIG. 4 are used for shaping purposes and would not be needed in those applications in which the triggering waveform is not critical. Additionally, frame sequences other than the frame sequence illustrated can be used; for example, the phase shift can be between three or more frames or there can be a random phase shift oscillation between frames at intervals other than H/4. Although the invention has been described in terms of an interlaced field system, the invention can also be used in a sequential line system. And although a rectangular waveform has been used, triangular or sinusoidal waveforms can be used as long as the waveform has a crisp leading edge; the rest of the waveform is unimportant. It is therefore intended in the appended claims to cover all such changes and modifications as fall within the true spirit and scope of the invention.

What is claimed is:

1. In an electron beam scanning system having an integral number of fields scanned per frame and including a scanning device and a display device utilizing a cathode ray tube having an electrostatic deflection unit and an electromagnetic deflection unit, apparatus for deflecting successive frames comprising:

commutator means connected to said electrostatic deflection unit, and biasing means coacting with said commutator means to sequentially provide a bias voltage during alternate frames being scanned.

2. In an electron beam scanning system of the line interlace type having an integral number of fields scanned per frame and including a scanning device, a display device and means having a vertical drive pulse train output for synchronizing said scanning device and said display device, apparatus for deflecting successive frames comprising:

means for separating said vertical drive pulse train output into first, second, and third electrical paths, said first electrical path comprising wave-forming means for producing complementary wave outputs, said second electrical path comprising means for delaying said vertical drive pulse train output by a predetermined amount, said third electrical path comprising means responsive to the outputs of said first and second electrical paths for allowing successive frames to interlace in their formation of a frame, and means connected to the output of said third electrical path for allowing each successive frame to be shifted with respect to each other and for allowing successive frames to be interlaced.

3. The apparatus as defined in claim 2 wherein said first electrical path comprises first and second multivibrators connected in series with each other to produce a pair of complementary wave train outputs synchronized with each other with one-fourth the frequency of said original vertical drive pulse train.

4. The apparatus as defined in claim 2 wherein said second electrical path comprises first and second monostable multivibrator means connected in series with each other, and wherein said first monostable multivibrator delays said vertical drive pulse train output by an amount equivalent to one-fourth the duration of a horizontal scanning line and said second monostable multivibrator shapes the output of said first monostable multivibrator.

5. The apparatus as described in claim 2 wherein said third electrical path comprises first and second AND gate means coacting with said first and second electrical paths to produce a first pulse train which is in phase with the original vertical drive pulse train but with every other pulse pair absent and a second pulse train which is delayed with respect to the original vertical drive pulse train and with every complementary pulse pair missing with respect to said first pulse train.

6. The apparatus as defined in claim 2 wherein said means for allowing each successive frame to be shifted with respect to one another comprises an OR gate having as its inputs the said first and second pulse trains and having a pulse train output with the desired timing relationship between the leading edges of each pair of pulses in said output pulse train.

7. The apparatus as defined in claim 2 which further includes non-inverting buffer means connected between the output of said synchronizing means and the input to said means for separating said vertical drive pulse train output into first, second and third electrical paths.

8. The apparatus as defined in claim 2 which further includes third and fourth monostable multivibrators connected to the output of said frame-shifting means, one of said monostable multivibrators being connected to the input of said scanning device to provide the proper triggering waveform and the other of said monostable multivibrators being connected to the input of said display device to provide the proper waveform for triggering said display device.

References Cited

UNITED STATES PATENTS

| | | | |
|---|---|---|---|
| 2,274,366 | 2/1942 | Hansen | 178—7.7 |
| 2,681,383 | 6/1954 | Loe | 178—7.7 |
| 3,116,436 | 12/1963 | Sweeney | 315—18 |

ROBERT L. GRIFFIN, Primary Examiner

H. W. BRITTON, Assistant Examiner

U.S. Cl. X.R.

315—18